April 20, 1965     M. S. BEDNAR     3,178,766
FISH HOLDDOWN AND SCALING DEVICE
Filed Nov. 22, 1963
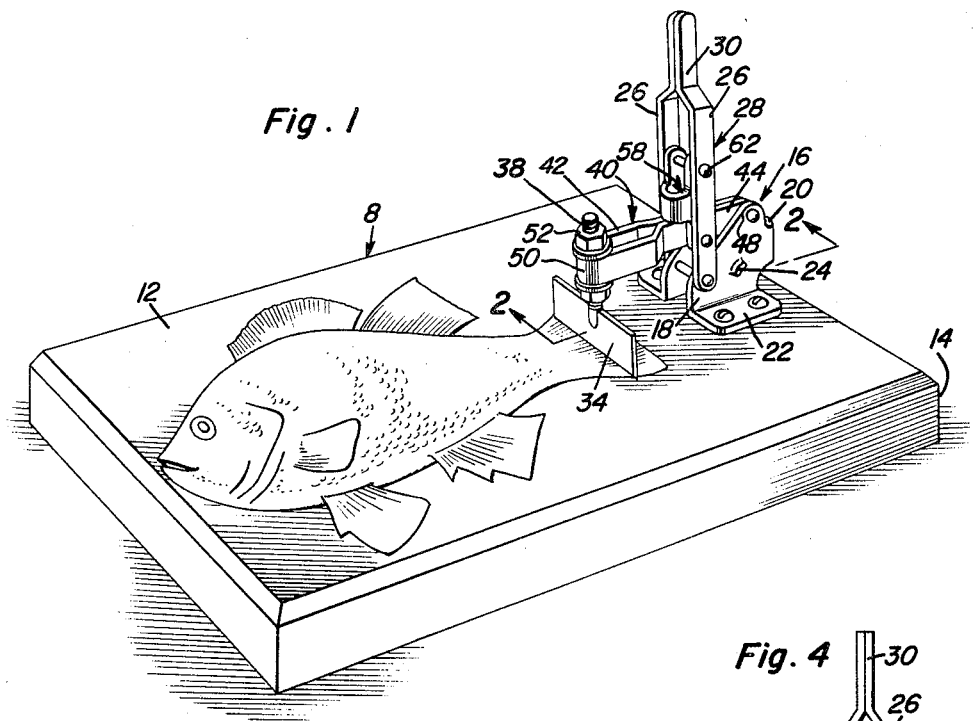
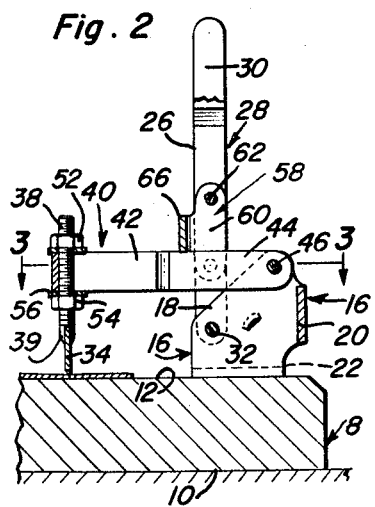
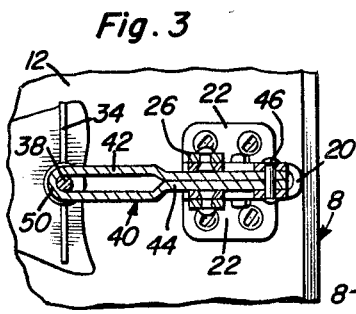
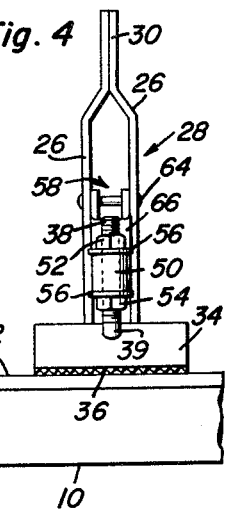
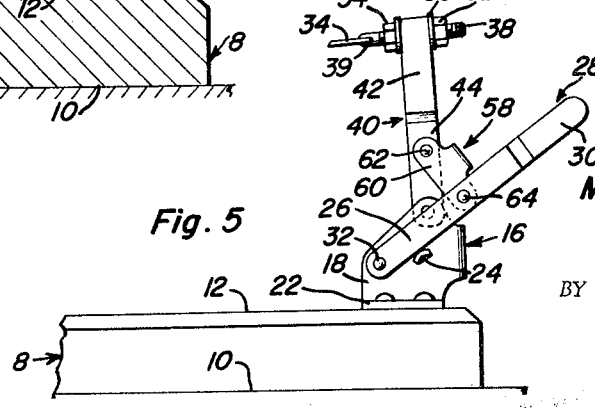
Michael S. Bednar
INVENTOR.

United States Patent Office 3,178,766
Patented Apr. 20, 1965

3,178,766
FISH HOLDDOWN AND SCALING DEVICE
Michael S. Bednar, 9901 Orleans Ave., Cleveland 5, Ohio
Filed Nov. 22, 1963, Ser. No. 325,563
2 Claims. (Cl. 17—8)

This invention relates to a portable manually actuatable device which is such in construction and purpose that it functions to reliably hold a fish in a readily accessible manner while the fish is being scaled. More particularly, it functions in a manner which keeps the fish from sliding and shifting around on the surface on which it is based and, what is more significant, anchors the tail of the fish in such a manner that there is little or no likelihood of damaging the fish which is being scaled.

Briefly, the invention comprises a flat faced wooden or equivalent board or panel on whose upper flat surface the fish is positioned and held while being scaled. This panel or base also supports clamping means the preferred embodiment of which is characterized by a flanged bracket screwed or otherwise mounted atop the base adjacent one end thereof. This bracket supports a vertically liftable and lowerable arm one end of which is pivoted on the bracket. The vertically liftable and lowerable forward end of the pivoted arm is equipped with novel tail clamping and holddown means, more particularly, a blade having saw teeth, said blade being adjustably mounted on said arm. A lever is also provided and is pivotally mounted on the bracket and operatively joined intermediate its ends to a median portion of the bracket supported pivoted arm. One improvement resides in a bracket-supported-arm wherein the free swingable end portion of the arm embodies an elongated loop. This loop serves to accommodate a readily attachable and detachable adjustable stud. This stud in turn is attached to and constitutes an integral part of the aforementioned sawtoothed blade which blade provides the fish tail clamping and holddown means.

Construed from another point of view the present invention features a base panel, a bracket removably mounted atop the panel at one end of the panel, a sawtoothed blade which when in functioning position is at right angles to the plane of the top of the base panel, said blade having a stud and means whereby it is adjustably connected with a component part of a locking type clamp device carried by the aforementioned bracket.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of a fish holddown or clamping device or base embodying the present invention;

FIGURE 2 is a view in section and elevation on the section line 2—2 of FIGURE 1;

FIGURE 3 is a horizontal section on the plane of the section line 3—3 of FIGURE 2;

FIGURE 4 is a view in end elevation looking at FIGURE 1, for example, from left to right; and FIGURE 5 is a view similar to FIGURE 1 but in side elevation and which shows the lever in its released or elevated position and illustrates the relationship of the lever and connecting link thereto.

With reference to the drawing the base (a simple board or panel) is denoted by the numeral 8 and has flat top and bottom surfaces 12 to 10, the surface 12 being suitable for reception and retention of the object which is being clamped and which in the instant matter is a fish. The tail clamping and holddown means is preferably, but not necessarily, mounted at the central portion of one transverse end 14 of the base. The clamping means herein preferred comprises an anchoring bracket 16 having a pair of spaced parallel plate members 18 joined by a connecting web 20. The plate-like members are provided with outstanding flanges 22 which are screwed or otherwise fastened atop the base. Median portions of the plate-like members are provided with struck-out tongues which are located relative to each other whereby to thus provide suitable limit stops 24 for the arm portions or limbs 26 of the yoke-type lever 28. Corresponding ends of the limbs are secured together and provide a convenient operating handle or grip 30. The limbs straddle the plate-like members and have their lower ends pivotally joined as at 32 whereby to permit the lever to assume the vertical clamping and retaining position shown in FIGURE 1, for example, and also to assume the clamp-releasing inclined position illustrated in FIGURE 5.

The fishtail-engaging clamping member comprises a simple rigid blade 34 having a toothed lower edge 36 (FIGURE 4). A screw-threaded stud 38 has a lower bifurcated end 39 fixedly joined to the median upper edge of the blade 34. This blade-equipped stud is detachably and adjustably mounted on the vertically swingable clamp carrying arm 40. This arm is fashioned from a length of strap metal bent upon itself between its ends to provide a loop 42 at one end and a shank 44 at the other end. The shank is positioned between the plate members of the bracket and has an end portion pivotally connected at 46 to upper ear portions 48. The rounded end portion 50 of the loop provides a crotch or seat for the median portion of the stud 38. The stud is provided with upper and lower screw-threaded nuts 52 and 54 which bear against and cooperate with appropriate washers 56, these washers being sandwiched between the nuts and cooperating edge portions of the loop 42. Accordingly, the clamping blade 34 is adjustable as well as attachable and detachable.

The operating connection between the lever 28 and the blade-equipped arm 40 comprises a link 58 having spaced parallel side members 60 corresponding end portions of which straddle the shank 44 (see FIGURE 5) and are hingedly connected thereto at 62. The opposite end portions are located between the limbs 26 of the lever and are hingedly joined thereto as at 64. The two members are joined by a curved web 66 which when in the released position appears as illustrated in FIGURE 5 and when in the locking or retaining position occupies the arm holddown position shown in FIGURE 2.

It will be evident that the invention provides a device which keeps the fish (or other held object) from sliding around and holds down the tail of the fish thus facilitating scaling and dressing steps. The fact that fish are always scaled from the tail to the head, it will be evident that the invention is highly desirable in that it keeps the fish firmly in place by its tail and does not in any manner damage the fish. In practice and before the fish is placed on the board or base it is assumed that the clamping device is in the open position illustrated in FIGURE 5. Here the hand-operated lever 28 assumes an inclined position with the limbs 26 resting on the limit stops (lugs or the like) 24. The link means 58 suspends the jaw or clamp-equipped arm 40 in the up position shown. However, by catching hold of the handle or grip 30 and moving the lever in a direction from right to left it will be evident that the arm 40 swings down on its pivot point 46 bringing the clamping jaw or blade into position against the tail of the fish and also moving the link means 58 from the bridging position between 28 and 40 (FIGURE 5) to the final clamping or holddown position illustrated to advantage in FIGURES 1 and 2.

It is important to note that the invention is novel in that the blade 34 is adjustable at right angles to the lengthwise dimension of the loop 42 and is also bodily shiftable lengthwise in the loop. It follows that novelty is predicated, therefore, on the combination of the base 14, a bracket anchored and supported locking type clamp, a tail clamping blade 34 and the aforementioned detachable adjustable connection, more particularly, the loop equipped arm 40 and a detachable adjustment means illustrated in particular at the left in FIGURE 2 of the official drawings.

It will be evident that when the handle 30 is caught hold of and pulled back to a position illustrated in FIGURE 5 the sawtoothed blade 34 is lifted up and away from the surface 12. The fishtail is then inserted under the blade position. By pulling the handle forwardly and downwardly the blade is lowered and clampingly binds the fishtail whereby it is thus securely retained in the ready-to-scale position illustrated in FIGURE 1. To scale the other side of the fish the operation is repeated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a bracket provided with attaching and retaining flanges and also with outstanding limit stop lugs, a lever comprising a yoke, said yoke embodying a pair of spaced parallel opposed arms straddling and having terminal end portions pivotally mounted on cooperatively associated component parts of said bracket, said lever also having an upper end embodying a handgrip, an arm having one end pivoted on said bracket, having its other end provided with a detachable and an adjustable blade constituting a clamping jaw, and an operating connection between median portions of the lever and arm respectively, said operating connection comprising a pair of spaced parallel members joined together by a connecting web and providing a link, said members straddling and being pivotally joined to the arm at like ends, having opposite ends pivotally joined to the median portions of the limbs of the yoke, said web being arranged so that the major portion of the overall link folds into a position between the limbs of the yoke when the lever is in the clamp-applied position at which time said web projects beyond adjacent edges of the limbs and is thus adapted to seat itself firmly against cooperating edge portions of said arm, and a base having a fish positioning surface on which said bracket is mounted.

2. In combination, a portable basing board having a firm flat surface atop which a fish is adapted to be positioned flatwise for scaling requirements, bracket means mounted atop said surface at an end portion of said board, clamping means pivotally and operatively mounted on said bracket means, said clamping means embodying a vertically liftable and lowerable pivoted arm having an elongated loop at a free end thereof capable of assuming a horizontal plane spaced vertically above the board's surface when in a given position, a sawtoothed blade normally assuming a vertical plane at right angles to the horizontal plane of said surface, said blade being provided with a screw-threaded stud and assembling and retaining nuts, said stud extending through the opening of said loop and being seated and clampingly held in an end portion of said loop, the cooperating nuts on said stud being detachably and adjustably and clampingly associated with upper and lower cooperating longitudinal edge portions of said loop.

References Cited by the Examiner

UNITED STATES PATENTS

| | | | |
|---|---|---|---|
| 2,300,321 | 10/42 | Swezey | 17—8 |
| 2,303,618 | 12/42 | Couleur | 248—361 X |
| 2,945,256 | 7/60 | Harper | 17—8 |
| 3,030,062 | 4/62 | Chevalier | 248—361 |

SAMUEL KOREN, *Primary Examiner.*

LUCIE H. LAUDENSLAGER, *Examiner.*